March 12, 1957     N. J. PRESTIGIACOMO     2,784,529
COMBINED WATER TANK AND TREE ORNAMENT
Filed Aug. 31, 1955

Nick J. Prestigiacomo
INVENTOR

BY *C. A. Snow & Co.*
ATTORNEYS.

United States Patent Office 2,784,529
Patented Mar. 12, 1957

2,784,529
COMBINED WATER TANK AND TREE ORNAMENT

Nick J. Prestigiacomo, Madison, Wis.

Application August 31, 1955, Serial No. 531,750

1 Claim. (Cl. 47—57.5)

This invention relates to a combined Christmas tree ornament and water tank designed for supplying moisture to a Christmas tree on which the ornament is supported, thereby to prolong the life of the tree while indoors and prevent the pine needles of the Christmas tree from drying and falling on the floor at the base of the tree.

An important object of the invention is to provide an ornament which is of hollow construction to provide a tank, with means for allowing the water in the tank to be fed to the trunk of the tree on which the ornament is positioned, a portion of the water gradually trickling downwardly over the tree trunk to supply additional moisture to the trunk of the tree, reducing the chances of the tree becoming a fire hazard.

Other and further objects and advantages of the invention will be hereinafter described and the novel features thereof defined in the appended claim.

Referring to the drawing.

Figure 1:
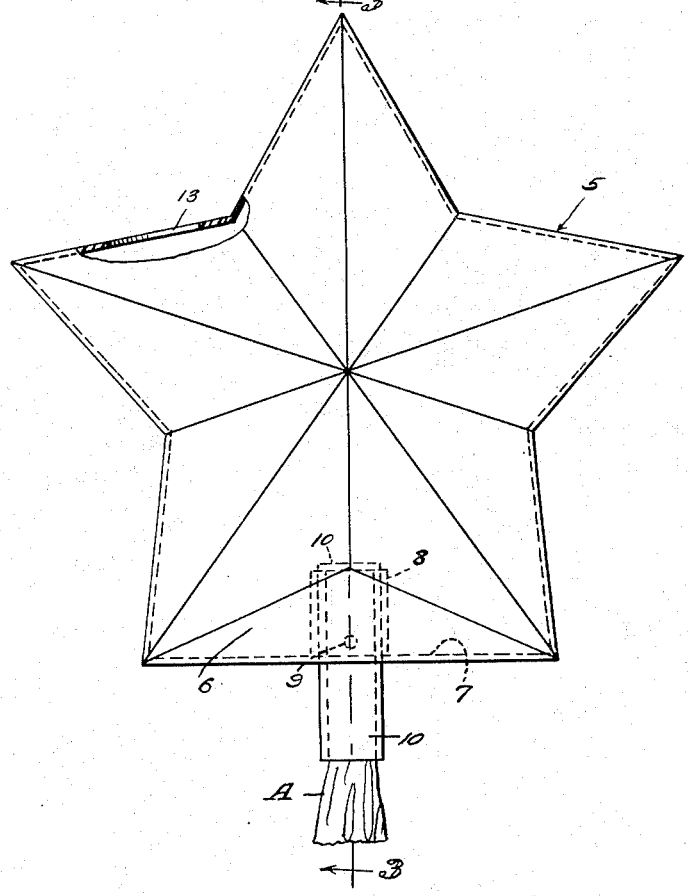
Fig. 1 is an elevational view of a combined water tank and tree ornament, constructed in accordance with the invention.
Figure 3:
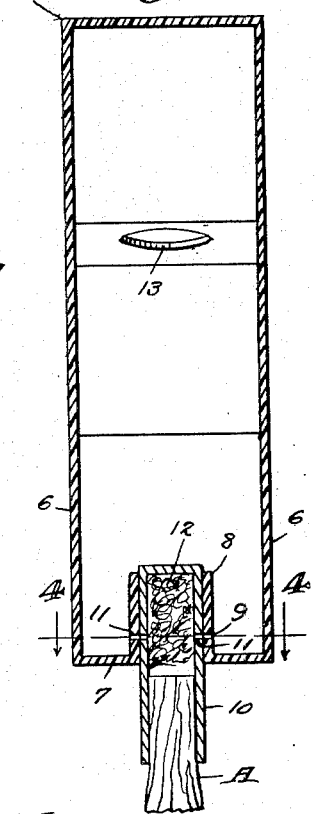
Fig. 3 is a sectional view taken on the line 3—3 of Fig. 1.
Figure 2:
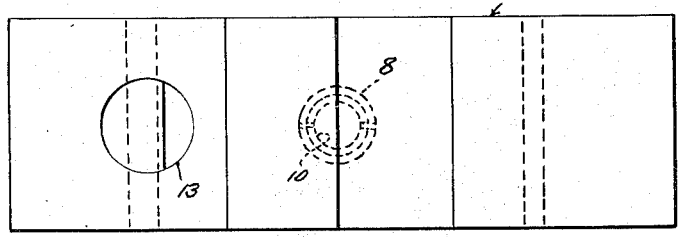
Fig. 2 is a plan view thereof.
Figure 4:
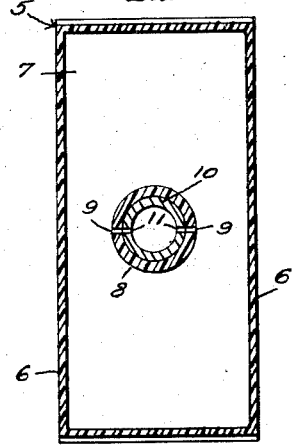
Fig. 4 is a transverse sectional view taken substantially on line 4—4 of Fig. 3.

Referring to the drawing in detail, the ornament forming the subject matter of the present invention, is designed as a five pointed star, the body portion being constructed preferably of translucent plastic material and hollow to provide a water tank.

As shown, the body portion which is indicated generally by the reference character 5 has the space between the two lowermost points of the star, closed as by means of the side walls 6 and bottom wall 7, the bottom wall 7 being formed with an upstanding pipe section 8 disposed at a point intermediate the ends of the bottom wall and spaced from the side walls of the body.

Discharge openings 9 are formed in the upstanding pipe section 8, so that water contained within the body portion may find its way from the body portion, through said openings.

Extending into the pipe section 8, is a supporting tube 10 which also has openings 11 that communicate with the openings 9 of the pipe section 8, so that water passing through the discharge openings 9 may pass into the supporting tube 10.

The supporting tube is designed to fit over the upper end of the tree, which in the present showing is indicated by the reference character A, so that water within the body portion or tank portion of the ornament may find its way into the tree trunk, through the upper end of the tree. In this way, water supplied to the tree will maintain the tree green so that the pine needles thereof will not fall off, and at the same time will to a degree, eliminate a fire hazard caused by the extreme dryness of the tree incident to the tree being subjected to the heat in a house.

In order that the water or moisture may find its way gradually to the tree, a water absorbent material indicated at 12 is disposed within the supporting tube 10 and overlies the openings 9 and 11 to become saturated with water from the tank passing through the openings, the water being absorbed by the trunk of a tree through the end thereof or over the outer surface of the tree trunk, maintaining the tree and needles thereof green.

Formed in the upper surface of one of the points of the star, is an opening 13 through which an electric lamp may be extended to supply light to the interior of the body of the ornament to increase the ornamental aspect thereof.

From the foregoing it will be seen that because the openings 9 and 11 are disposed adjacent to the bottom wall 7 of the body, the moisture or water from the tank of the ornament will find its way into the supporting tube 10, and substantially the entire quantity of water contained in the tank will flow through the openings.

Of course while the opening 13 has been designed for the reception of an electric lamp, the opening also affords means whereby water may be poured into the body portion to the desired level.

While I have shown and described the ornament in the form of a star, it is to be understood that the general design of the ornament may be varied to meet various requirements of use and design, without departing from the spirit of the invention.

While the specific details of one embodiment of this invention have been herein shown and described, the invention is not confined thereto as changes and alterations may be made without departing from the spirit and scope thereof as defined in the appended claim.

I claim:

An ornament of the class described, comprising a hollow figured translucent body, a tank formed at the base of said body, a pipe section rising from the bottom of said tank communicating at its lower end with the atmosphere, a tube inserted in said pipe section, an upper end wall carried by said tube, said tube and pipe section having aligning openings above said bottom through which water enters the tube from said tank, said tube providing a support for telescopically positioning the tube on the trunk of a tree, and absorbent material within the upper portion of said tube and confronting said opening for retarding the passage of water from said tube to said tree.

References Cited in the file of this patent
UNITED STATES PATENTS

| | | |
|---|---|---|
| 1,678,046 | Holmes | July 24, 1928 |
| 2,095,451 | Reynolds | Oct. 12, 1937 |
| 2,145,934 | Kingman | Feb. 7, 1939 |
| 2,203,016 | Hahn | June 4, 1940 |
| 2,375,860 | Markham | May 15, 1945 |
| 2,595,782 | Epstein | May 6, 1952 |
| 2,673,362 | Robinson | Mar. 30, 1954 |
| 2,730,838 | Wilson | Jan. 17, 1956 |

FOREIGN PATENTS

| | | |
|---|---|---|
| 164,374 | Austria | Nov. 10, 1949 |
| 188,456 | Germany | Sept. 10, 1907 |
| 460,184 | Germany | May 22, 1928 |
| 678,660 | Germany | July 19, 1939 |

OTHER REFERENCES

U. S. Department of Agriculture. Leaflet 193 (December 1939), "Fireproofing Christmas Trees."

"The Clip-Oil," published October 1950, Information Series No. 3, by Department of Agricultural Engineering, N. C. Agricultural Experiment Station, Raleigh, N. C., pages 6–9.